United States Patent [19]

Salce

[11] Patent Number: 4,832,478

[45] Date of Patent: May 23, 1989

[54] SPECTACLE HINGE ASSEMBLY

[75] Inventor: Arthur J. Salce, Southbridge, Mass.

[73] Assignee: American Optical Corporation, Southbridge, Mass.

[21] Appl. No.: 117,768

[22] Filed: Nov. 5, 1987

[51] Int. Cl.[4] .......................... G02C 5/14; G02C 5/22
[52] U.S. Cl. .................................. 351/121; 351/153; 16/228
[58] Field of Search .................. 351/121, 153; 16/228

[56] References Cited

U.S. PATENT DOCUMENTS

D. 285,452  9/1986  Tabacchi .
3,156,756  11/1964  Seaver .
4,699,479  10/1987  Metcalfe .

Primary Examiner—Rodney B. Bovernick
Attorney, Agent, or Firm—Fishman, Dionne & Cantor

[57] ABSTRACT

Disclosed is a hinge assembly for an eyeglass frame which comprises a male hinge member to which a female hinge member is pivotally interconnected. The female hinge member includes a pair of parallel hinge leaves which are joined by a connecting wall in the outer side of the female hinge member. Each hinge leaf includes a pin-receiving slot perpendicular to the longitudinal axis of the female hinge member and a ramp leading to the slot. A raised surface positioned between each ramp and the connecting wall helps guide a pin along the ramp. The male hinge member includes a hinge ear with a pin extending above and below it. The male hinge member and the female hinge member are brought together by inserting the hinge ear between the hinge leaves, with the pin aligned against the side of the raised surfaces as a guide, and forcing the members together so that the pin travels along the ramps until it is engaged by the pin-receiving slots.

35 Claims, 2 Drawing Sheets

4,832,478

SPECTACLE HINGE ASSEMBLY

BACKGROUND OF THE INVENTION

This invention relates in general to eyeglass frames and more particularly to eyeglass frames which are both easily manufactured and quickly assembled.

The majority of eyeglass frames manufactured today include a lens supporting structure to which two temples are pivotally attached by means of a hinge assembly. The hinges can be metal or plastic, and a pin secures the hinge member of the lens support to the hinge member of the temple. The hinge members are glued, screwed or fastened by some other means to the lens support and temple. Assembly of such frames utilizing metal or plastic hinges with a screw or pin required a number of manufacturing steps which complicate the assembly process.

Eyeglass frames are also manufactured using other known pivoting connector assemblies which provide free movement of the temples with respect to the lens supporting structure. A basic requirement for any pivoting connector assembly is that the temple movement be made easily, and the pivoting assembly be strong and reliable. The pincipal problem with all known assemblies, as in the case of hinge assemblies described above, is that the assemblies are rather complex. This complexity results in added initial hardware and assembly costs as well as unnecessarily high repair costs.

In co-pending U.S. patent application Ser. No. 018,746 filed Mar. 3, 1987, which is assigned to the assignee of the present invention, a spectacle hinge assembly is disclosed in which, in one embodiment, the lens supporting structure includes a receiving member having a pair of ramped slots for receiving a temple member that supports a pin. As the temple member is forced into the receiving member with the pin aligned with the slots, the slotted portions of the receiving member separate until the pin is captured in a hole at the end of the slots. In another embodiment, the pin is a spring loaded pin and the slotted portions do not separate. The pin simply compresses until it is captured in the hole.

In U.S. Pat. No. 4,699,479 (also assigned to the assignee of the present invention) another spectacle hinge assembly is disclosed in which the temple member includes a pair of ramped slots and a lens supporting structure includes an extension that retains a pin. During assembly the pin is aligned with the slots and the parts forced together until the pin is captured by a pin receiving hole at the end of the slots.

In U.S. Pat. No. 3,156,756 a spectacle hinge structure is disclosed in which a first member has a pair of apertured hinge leaves with ramped guide slots leading to each aperture (pin hole) and a second member embodies a hinge ear with opposing outwardly extending lugs (pins). When the hinge ear is forced between the hinge leaves with the lugs aligned with the ramped slots, the hinge leaves open slightly until the lugs fall into the apertures.

In U.S. Des. 285,452, there is disclosed a temple member for a spectacle with an integral hinge housing. The hinge housing comprises two hinge leaves, each of which have a slot leading to a pin-receiving aperture.

While the spectacle hinge assemblies described above may provide for easy assembly and, in some cases, a reliable hinge structure, the molding process for creating the two-hinge components is rather complicated and unnecessarily increases the cost of tooling production. Specifically, each of these structures require very close fitting of molding tools as well as secondary tooling motions that are not in the direction of mold closure.

It is therefore a principal object of the present invention to provide an eyeglass frame structure which is easily assembled and easily molded.

A further object of the present invention is to provide an eyeglass frame which can be molded without the need for secondary side motions in the tooling.

Still another object of the present invention is to provide an eyeglass frame which is strong and reliable and which can be inexpensively manufactured.

SUMMARY OF THE INVENTION

The eyeglass frame structure of the present invention comprises a lens supporting structure to which at least one temple is pivotally attached. Each temple includes a pair of parallel hinge leaves which are joined by a connecting wall on the outer side of the temple. Each hinge leaf includes a pin receiving slot perpendicular to the longitudinal axis of the temple and a ramp leading to said slot. A raised surface positioned between each ramp and the connecting wall helps guide the pin along the ramp. The lens supporting structure includes a hinge ear projecting rearwardly from each side with a hinge wall extending from the top and bottom thereof. The lens supporting structure and the temple are brought together so that the two ends of the pin are guided against the sides of the raised surfaces of the two hinge leaves. In one embodiment, as the temple and lens supporting structure are urged towards one another, the hinge leaves of the temple are forced apart by the ends of the pin as the pin travels along the ramps until the pin reaches the pin-receiving slots, at which point the ends of the pin wall into the slots. In an alternate embodiment the pin is a spring-loaded pin which compresses as it is forced along the ramps until it reaches the slots where it will expand and lock in place.

These and other features and objects of the present invention will be more clearly understood from the following detailed description of the preferred embodiments which should be read in light of the accompanying drawings, in which corresponding reference numerals refer to corresponding parts throughout the several views.

DETAILED DESCRIPTION OF THE PREFERRED EMBODIMENTS

Figure 1:
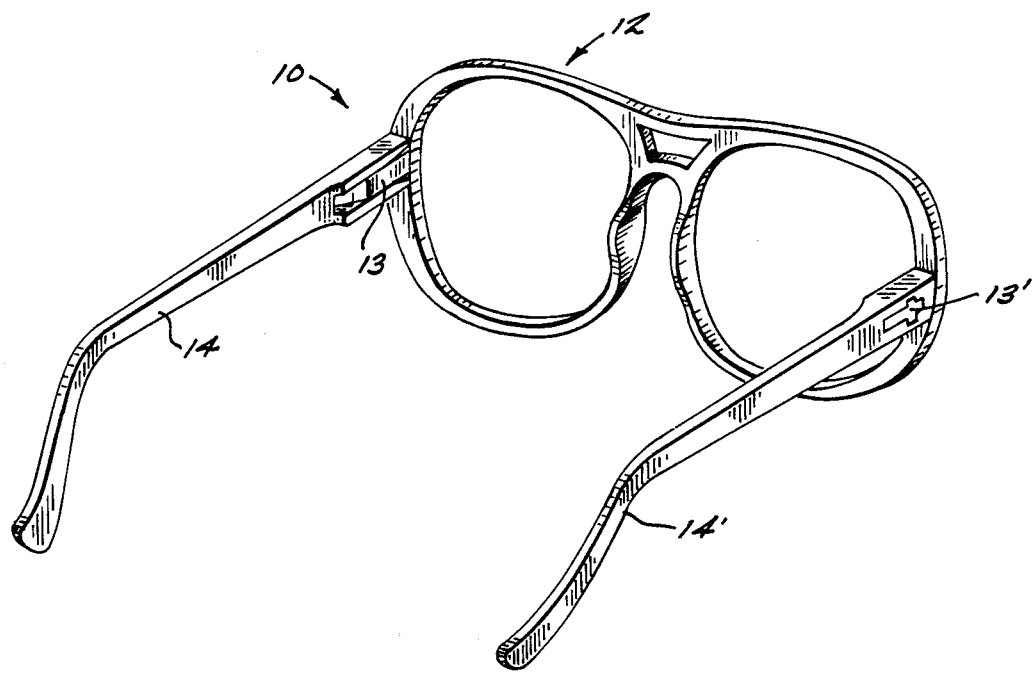
FIG. 1 is an isometric view of an eyeglass frame according to the present invention in which the temples are attached to the lens supporting structure through the unique hinge assembly of the present invention.
Figure 2:
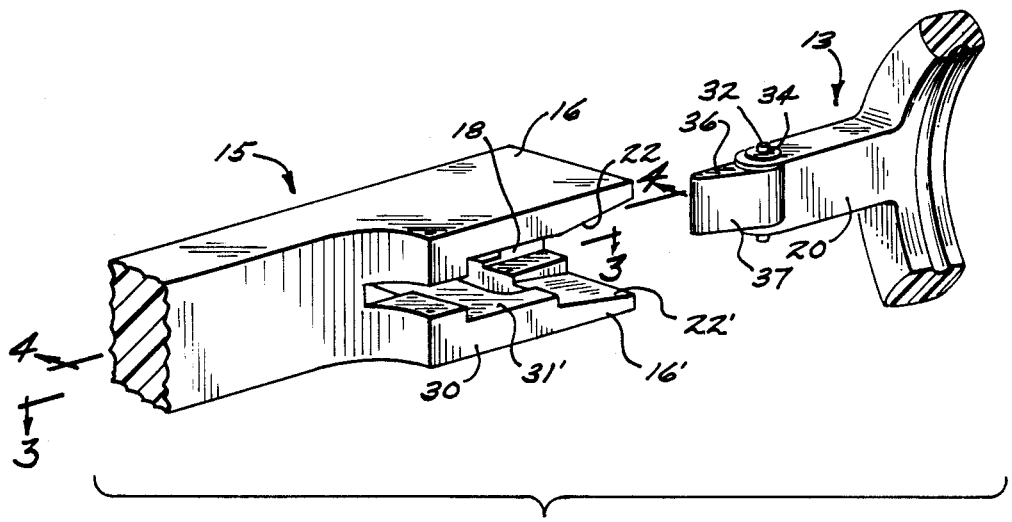
FIG. 2 is an isometric view of the hinge assembly of the eyeglass frame of the present invention.
Figure 3:
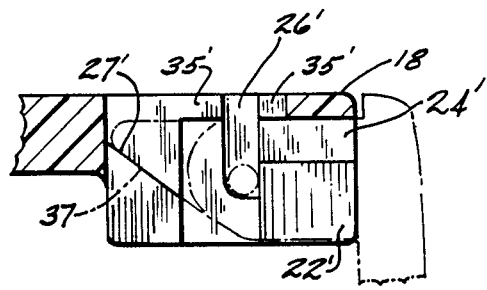
FIG. 3 is a sectional view taken along lines 3—3 of FIG. 2.
Figure 4:
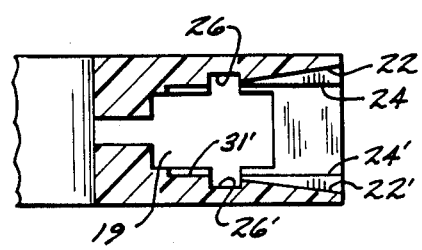
FIG. 4 is a sectional view taken alone lines 4—4 of FIG. 2.
Figure 5:
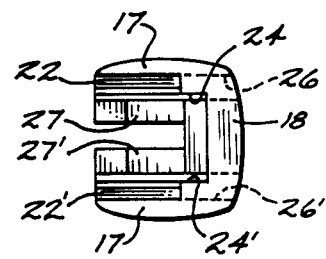
FIG. 5 is a front elevational view of a female member of the hinge assembly shown in FIG. 2.
Figure 6:
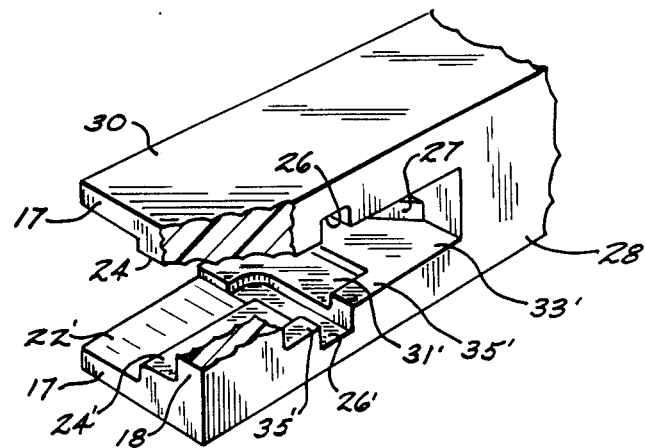
FIG. 6 is an isometric view of the female member of the hinge assembly shown in FIG. 2 taken from the opposite side of that shown in FIG. 2, and partially cut away to reveal certain details thereof.

In accordance with the present invention, the eyeglass frame 10, shown in FIG. 1, includes a lens supporting structure 12 and two templates 14,14'. Temple connecting or male hinge members 13, 13', integrally attached to lens supporting structure 12, extend in a generally rearward perpendicular direction from each end of the lens supporting structure 12. Temples 14,14' are pivotally connected to temple-connecting members 13,13', respectively. The temples 14, 14' pivot between an open position which enables the user to wear the eyeglasses and support the temples with his ears and a closed position which allow the eyeglasses to be stored. In FIG. 1, the temples 14, 14' are in the open position.

The frame hinge assembly of the present invention, shown most clearly in FIGS. 2-6, enables a temple 14 to be easily and quickly secured to the lens supporting structure 12. Male hinge member 13 comprises hinge ear 20 with hinge pin 32 inserted in pin supporting hole 34. Optionally, hinge pin 32 may be spring loaded so that one or both ends compress toward the center upon application of pressure, or it may be fabricated as part of hinge ear 20 (e.g. by molding if hinge ear 20 is a molded polymer) such that it consists merely of pivot lugs extending outwardly from the top and bottom hinge ear 20. The design, or fabrication of hinge pin 32 is not important so long as the function is present. In a preferred embodiment, male hinge member 13 additionally comprises stabilizing tang 36 extending longitudinally from hinge ear 20. Stabilizing tang 36 is slightly narrower, in the vertical dimension, than hinge ear 20 and has an inner face 37 disposed at an angle such that said tang is thickest at hinge ear 20.

Female hinge member 15 is located at the end of temple 14 and, in an assembled frame, is interconnected with male hinge member 13. Female hinge member 15 includes two hinge leaves 16, 16' extending therefrom and connected at one side (the exterior side 28 of the temple) by a connecting wall 18. The wall 18 and the hinge leaves 16, 16' define an opening for engaging male hinge member 13. Wall 18 also acts as a stop against which hinge ear 20 of male hinge member 13 abuts when the temple is pivoted to the open (wearing) position. Hinge leaves 16, 16' of the female hinge member include opposed ramps 22, 22' respectively, the distance between which decreases as one proceeds inwardly from open end 17 of said female hinge member, and raised parallel surfaces 24, 24' respectively, which lie between wall 18 and ramps 22, 22' respectively. Raised surfaces 24, 24' are spaced apart a sufficient distance so that hinge ear 20 of male hinge member 13 fits therebetween, preferably in snug-fitting relation. At the inner end of ramps 22, 22', (i.e. at the end where the ramps are closest to one another), slots 26, 26' extend perpendicularly from exterior side 28 of the female hinge member 15 toward interior side 30, but stopping a short distance beyond raised surfaces 24, 24' and before reaching interior side 30. Each slot is wide enough and deep enough and extends far enough beyond raised surfaces 24, 24' so as to allow for snug engagement of hinge pin 32. As can be seen more clearly in FIG. 6, each slot is bounded on one side by a ramp 22 (or 22') and a raised surface 24 (or 24') and on the other side by a raised bearing surface 31 (or 31'). It is generally preferred that raised surface 24 and bearing surface 31 are at the same level. The distance between the two slots 26, 26' is greater than the distance between the two ramps at the inner end of said ramps, but is approximately the same distance as that between the two ramps at the end 17. This latter distance is approximately the same or slightly greater than the distance spanned by hinge pin 32. Raised stops 35, 35', along exterior side 28, and preferably on each side of slots 26, 26', are slightly higher in elevation than raised surfaces 24, 24' and bearing surfaces 31, 31' (that is the distance between raised stops 35 and 35' is less than the vertical dimension or width of hinge ear 20) so that hinge ear 20 cannot be pushed beyond said stops when the temple is in the closed position. An optional opening 19, defined by stabilizing surfaces 33, 33', may be included within female hinge member 15 inwardly of bearing surfaces 31, 31' for snug engagement of optional stabilizing tang 36. Stabilizing surfaces 33, 33' are preferably at the same level as raised stops 35, 35', all of which span a distance approximately equal to the vertical dimension (or width) of tang 36.

It is an important feature of the present invention that ramps 22, 22' extend from the raised surfaces 24, 24' to interior side 30 of the female hinge member. Likewise, it is equally important that slots 26, 26' extend to exterior side 28. It is these factors that enable both the ramps and the slots to be molded into the female hinge member without the need for any side action in the molding process since each component is in the mold press direction. In fact, the entire female hinge member as described above can be fabricated in a simple mold without the need for side action because all of the operative surfaces are formed by mold surfaces that move in the direction of mold closure.

A particularly unique feature of this invention is the utilization of slots 26, 26' as hinge pin receiving means. This feature replaces the need to install a pin receiving hole in female hinge member 15, which, until the present invention, has always been accomplished through a separate step, such as drilling the piece after fabrication, or through the use of side action in the molding process. Side action involves a separate mechanical step to manipulate a piece within the mold after it is closed and makes the molding process more complex and expensive. Elimination of side action significantly increases the speed and economics of molding parts.

In assembling the above-described hinge assembly, the male hinge member 13 is urged toward female hinge member 15 such that hinge ear 20 is inserted between hinge leaves 16, 16'. Hinge pin 32 slides along ramps 22, 22', guided by the walls of raised surfaces 24, 24', forcing hinge leaves 16, 16', slightly apart as it progresses toward slots 26, 26', where it ultimately snaps in place and comes to rest, allowing the hinge leaves to return to their normal position, thereby snuggly engaging hinge ear 20. Optional stabilizing tang 36 serves several functions. In one function its angular inner face 37 abuts cooperatively angled inner walls 27, 27' of female hinge member 15 when the temple is in the open (wearing) position to limit the angular movement of the temple to an approximately right angle with respect to the lens supporting structure 12. This angular movement is also restricted by the abutting of hinge ear 20 against wall 18 when the temple is in the open position. Another function of stabilizing tang 36 is to restrict the angular movement of the temple in the closed position so that the temple stops approximately parallel to the lens supporting structure 12. This function is accomplished when tang 36 abuts the side of wall 18. A third function of stabilizing tang 36 is to prevent up and down rocking of the temple when in the open (wearing) position. This function is accomplished when the tank is snuggly engaged between stabilizing surfaces 33, 33' of the hinge leaves (see FIG. 6).

While the foregoing invention has been described with reference to its preferred embodiments, various modifications, substitutions and alterations may occur to those skilled in the art. These and all such modifications and variations that will occur to those skilled in the art are intended to fall within the scope of the appended claims.

What is claimed is:

1. An unassembled hinge comprising a male hinge member and a female hinge member adapted to be pivotally interconnected wherein said male hinge member comprises an elongated hinge ear of a certain vertical width having a hinge pin extending above and below said hinge ear; and said female hinge member comprises a pair of hinge leaves with an open end for receiving said male hinge member therebetween, a first side and a second side, opposing pin-receiving elongated slots in said hinge leaves, said slots being perpendicular to the longitudinal axis of said female hinge member and extending inwardly from said first side part way across and extending only partially through said hinge leaves, the distance between said slots being approximately equal to the distance spanned by said hinge pin, and means for stopping lateral movement of said male hinge member outwardly along said slots toward said first side;

whereby said male hinge member may be pivotally interconnected to said female hinge member by inserting said hinge ear between said hinge leaves until said hinge pin is engaged by the inner end of said pin-receiving slots.

2. The unassembled hinge according to claim 1 wherein said female hinge member additionally comprises opposing ramps in said hinge leaves extending from said open end to said pin-receiving slots and from said second side inwardly part way across said hinge leaves, the distance between said ramps decreasing from said open end to said pin-receiving slots with the narrowest distance between said ramps being less than the distance spanned by said hinge pin.

3. The unassembled hinge according to claim 1 additionally comprising means for stopping the rotational movement of the female hinge member with respect to the male hinge member when pivotally interconnected.

4. The unassembled hinge according to claim 1 wherein said hinge leaves are connected along a portion of their length by a connecting wall positioned at said first side near said open end.

5. The unassembled hinge according to claim 1 wherein said female hinge member additionally comprises opposing parallel raised surfaces within said hinge leaves adapted to snuggly engage said hinge ear therebetween.

6. The unassembled hinge according to claim 5 wherein said raised surfaces are located on each side of said slots, the raised surfaces located on the side of said slots nearest the open end of said hinge leaves being positioned between said ramps and said first side and extending from said open end to said slots, and the raised surfaces located on the side of said slots away from said open end extending from said second side inwardly toward said first side.

7. The unassembled hinge according to claim 1 wherein said means for stopping lateral movement comprises opposing raised stops located along said first side of said hinge leaves near said pin-receiving slots, the distance between said opposing stops being less than the vertical width of said hinge ear so as to prevent passage of said hinge ear beyond said first side.

8. The unassembled hinge according to claim 1 wherein said male hinge member additionally comprises a stabilizing tang extending longitudinally from said hinge ear, said stabilizing tang being slightly narrower in vertical width than said hinge ear, and said female hinge member additionally comprises an opening in said first side through which said stabilizing tang may extend during rotation of said hinge members, and opposed parallel stabilizing surfaces within said hinge leaves adapted to snuggly engage said stabilizing tang.

9. The unassembled hinge according to claim 8 additionally comprising:

means for stopping the rotational movement of the female hinge member with respect to the male hinge member when pivotally interconnected;

said hinge leaves being connected along a portion of their length by a connecting wall positioned at said first side near said open end; and wherein said means for stopping rotational movement comprises in a first stop position said hinge ear and said connecting wall adapted to abut each other and in a second stop position said stabilizing tang and said connecting wall adapted to abut each other.

10. A hinge comprising a male hinge member pivotally interconnected with a female hinge member wherein said male hinge member comprises an elongated hinge ear of a certain vertical width having a hinge pin extending above and below said hinge ear; and said female hinge member comprises a pair of hinge leaves with an open end for receiving said male hinge member therebetween, a first side and a second side, opposing pin-receiving elongated slots in said hinge leaves, said slots being perpendicular to the longitudinal axis of said female hinge member and extending inwardly from said first side part way across and extending only partially through said hinge leaves, the distance between said slots being approximately equal to the distance spanned by said hinge pin, and means for stopping lateral movement of said male hinge member outwardly along said slots toward said first side;

whereby said male hinge member is pivotally interconnected to said female hinge member by inserting said hinge ear between said hinge leaves until said hinge pin is engaged by the inner end of said pin-receiving slots.

11. The hinge according to claim 10 wherein said female hinge member additionally comprises opposing ramps in said hinge leaves extending from said open end to said pin-receiving slots and from said second side inwardly part way across said hinge leaves, the distance between said ramps decreasing from said open end to said pin-receiving slots with the narrowest distance between said ramps being less than the distance spanned by said hinge pin.

12. The hinge according to claim 10 additionally comprising means for stopping the rotational movement of the female hinge member with respect to the male hinge member when pivotally interconnected.

13. The hinge according to claim 10 wherein said hinge leaves are connected along a portion of their length by a connecting wall positioned at said first side near said open end.

14. The hinge according to claim 10 wherein said female hinge member additionally comprises opposing parallel raised surfaces within said hinge leaves adapted to snuggly engage said hinge ear therebetween.

15. The hinge according to claim 14 wherein said raised surfaces are located on each side of said slots, the raised surfaces located on the side of said slots nearest the open end of said hinge leaves being positioned between said ramps and said first side and extending from said open end to said slots, and the raised surfaces located on the side of said slots away from said open end extending from said second side inwardly toward said first side.

16. The hinge according to claim 10 wherein said means for stopping lateral movement comprises opposing raised stops located along said first side of said hinge leaves near said pin-receiving slots, the distance between said opposing stops being less than the vertical width of said hinge ear so as to prevent passage of said hinge ear beyond said first side.

17. The hinge according to claim 10 wherein said male hinge member additionally comprises a stabilizing tang extending longitudinally from said hinge ear, said stabilizing tang being slightly narrower in vertical width than said hinge ear, and said female hinge member additionally comprises an opening in said first side through which said stabilizing tang may extend during rotation of said hinge members, and opposed parallel stabilizing surfaces within said hinge leaves adapted to snuggly engage said stabilizing tang.

18. The hinge according to claim 17 additionally comprising:
    means for stopping the rotational movement of the female hinge member with respect to the male hinge member when pivotally interconnected;
    said hinge leaves being connected along a portion of their length by a connecting wall positioned at said first side near said open end; and
    wherein said means for stopping rotational movement comprises in a first stop position said hinge ear abutting said connecting wall and in a section stop position said stabilizing tang abutting a side of said connecting wall.

19. The hinge according to claim 10 wherein said male hinge member is integral with a lens supporting structure and said female hinge member is integral with a temple.

20. An eyeglass frame structure comprising a pair of temples and a lens supporting structure, each of said temples being pivotally interconnected to said lens supporting structure through an integral hinge, said integral hinge comprising a male hinge member and a female hinge member, said male hinge member being integral with said lens supporting structure and extending in a generally rearward perpendicular direction from one end of said lens supporting structure, said male hinge member comprising an elongated hinge ear of a certain vertical width having a hinge pin extending above and below said hinge ear;
    said female hinge member being integral with an end of said temple and comprising a pair of hinge leaves extending longitudinally from said temple and, said hinge leaves having an open end for receiving said male hinge member therebetween, an exterior side and an interior side, opposing pin-receiving elongated slots in said hinge leaves, said slots being perpendicular to the longitudinal axis of said temple and extending inwardly from said exterior side part way across and extending only partially through said hinge leaves, the distance between said slots being approximately equal to the distance spanned by said hinge pin, opposing ramps in said hinge leaves extending from said open end to said pin-receiving slots and from said interior side inwardly part way across said hinge leaves, the distance between said ramps decreasing from said open end to said pin-receiving slots with the narrowest distance between said ramps being less than the distance spanned by said hinge pin, and means for stopping lateral movement of said male hinge member outwardly along said stops toward said exterior side;
    whereby each of said temples is pivotally interconnected to said lens supporting structure by inserting said hinge ear between said hinge leaves and guiding said hinge pin along said opposing ramps until said hinge pin is engaged by the inner end said pin-receiving slots.

21. The eyeglass frame structure according to claim 20 additionally comprising means for stopping the rotational movement of the female hinge member with respect to the male hinge member when pivotally interconnected.

22. The eyeglass frame structure according to claim 20 wherein said hinge leaves are connected along a portion of their length by a connecting wall positioned at said first side near said open end.

23. The eyeglass frame structure according to claim 20 wherein said female hinge member additionally comprises opposing parallel raised surfaces within said hinge leaves adapted to snuggly engage said hinge ear therebetween.

24. The eyeglass frame structure according to claim 23 wherein said raised surfaces are located on each side of said slots, the raised surfaces located on the side of said slots nearest the open end of said hinge leaves being positioned between said ramps and said first side and extending from said open end to said slots, and the raised surfaces located on the side of said slots away from said open end extending from said second side inwardly toward said first side.

25. The eyeglass frame structure according to claim 20 wherein said means for stopping lateral movement comprises opposing raised stops located along said first side of said hinge leaves near said pin-receiving slots, the distance between said opposing stops being less than the vertical width of said hinge ear so as to prevent passage of said hinge ear beyond said first side.

26. The eyeglass frame structure according to claim 20 wherein said male hinge member additionally comprises a stabilizing tang extending longitudinally from said hinge ear, said stabilizing tang being slightly narrower in vertical width than said hinge ear, and said female hinge member additionally comprises an opening in said first side through which said stabilizing tang may extend during rotation of said hinge members, and opposed parallel stabilizing surfaces within said hinge leaves adapted to snuggly engage said stabilizing tang.

27. The eyeglass frame structure according to claim 26 additionally comprising:

means for stopping the rotational movement of the female hinge member with respect to the male hinge member when pivotally interconnected;

said hinge leaves being connected along a portion of their length by a connecting wall position at said first side near said open end; and wherein said means for stopping rotational movement comprises in a first stop position said hinge ear and said connecting wall adapted to abut each other and in a second stop position said stabilizing tang and said connecting wall adapted to abut each other.

28. A female hinge member adapted to be pivotally interconnected to a male hinge member comprising an elongated hinge ear of a certain vertical width and a hinge pin extending above and below said ear, wherein said female hinge member comprises a pair of hinge leaves with an open end for insertion of said male hinge member therebetween, a first side and a second side, opposing pin-receiving elongated slots in said hinge leaves, said slots being perpendicular to the longitudinal axis of said female hinge member and extending inwardly from said first side part way across and only extending partially through said hinge leaves, the distance between said slots being approximately equal to the distance spanned by said hinge pin, and means for stopping lateral movement of said male hinge member outwardly along said slots toward said first side, said slots and said stopping means being cooperatively adapted to capture and retain said male hinge member without the need for a hinge pin hole.

29. The female hinge member according to claim 28 additionally comprising opposing ramps in said hinge leaves extending from said open end to said pin-receiving slots and from said second side inwardly part way across said hinge leaves, the distance between said ramps decreasing from said open end to said pin-receiving slots with the narrowest distance between said ramps being less than the distance spanned by said hinge pin.

30. The female hinge member according to claim 28 additionally comprising means for stopping the rotational movement of the female hinge member with respect to the male hinge member when pivotally interconnected therewith.

31. The female hinge member according to claim 28 wherein said hinge leaves are connected along a portion of their length by a connecting wall positioned at said first side near said open end.

32. The female hinge member according to claim 28 additionally comprising opposing parallel raised surfaces within said hinge leaves adapted to snuggly engage said hinge ear therebetween.

33. The female hinge member according to claim 32 wherein said raised surfaces are located on each side of said slots, the raised surfaces located on the side of said slots nearest the open end of said hinge leaves being positioned between said ramps and said first side and extending from said open end to said slots, and the raised surfaces located on the side of said slots away from said open end extending from said second side inwardly toward said first side.

34. The female hinge member according to claim 28 wherein said means for stopping lateral movement comprises opposing raised stops located along said first side of said hinge leaves near said pin-receiving slots, the distance between said opposing stops being less than the vertical width of said hinge ear so as to prevent passage of said hinge ear beyond said first side.

35. The female hinge member according to claim 28 which is integral with one end of a molded plastic eyeglass temple.

* * * * *